United States Patent [19]

Scott

[11] 4,174,846
[45] Nov. 20, 1979

[54] SEALING RING

[75] Inventor: Lynn S. Scott, Salt Lake City, Utah

[73] Assignee: Parker-Hannifin Corporation, Cleveland, Ohio

[21] Appl. No.: 884,868

[22] Filed: Mar. 9, 1978

Related U.S. Application Data

[60] Continuation of Ser. No. 777,799, Mar. 15, 1977, abandoned, which is a division of Ser. No. 631,856, Nov. 14, 1975, Pat. No. 4,013,299.

[51] Int. Cl.² .............................................. F16J 15/32
[52] U.S. Cl. .................................................. 277/205
[58] Field of Search ............... 277/205, 206, 165, 176, 277/188 R

[56] References Cited

U.S. PATENT DOCUMENTS

| | | | |
|---|---|---|---|
| 3,851,888 | 12/1974 | Limpson et al. | 277/165 |
| 3,885,801 | 5/1975 | Scannell | 277/188 R |
| 4,013,299 | 3/1977 | Scott | 277/176 |
| 4,067,407 | 1/1978 | Berg | 277/205 |

*Primary Examiner*—Robert I. Smith
*Attorney, Agent, or Firm*—John N. Wolfram

[57] ABSTRACT

An annular sealing ring comprises a U cup having a pair of lips for forming a cavity therebetween and an elastomeric expander ring mounted within the cavity. Sealing edges on the lips are contacted by members to be sealed and are positioned on the outside of the lips at a vertical location at or below the horizontal center line of the expander ring when the expander ring is mounted within the cavity.

4 Claims, 5 Drawing Figures

SEALING RING

This is a continuation of application Ser. No. 777,799, filed Mar. 15, 1977 of Lynn S. Scott for SEALING RING and now abandoned which is a division of 613,856 filed Nov. 14, 1975 now U.S. Pat. No. 4,013,299.

BACKGROUND OF THE INVENTION

Sealing rings that comprise a U cup which retain an expander ring within a cavity are well known in the prior art. The sealing edges on such sealing rings extend sidewards from lips at the top of the U cup and are contracted by members to be sealed to deform the expander ring thereby loading the seal. The edges are disposed near the top of the U cup above the horizontal centerline of the expander ring when the expander ring is inserted in the cavity.

The loading of the sealing edges in the prior arrangement rotates the lip inner top portions into the expander ring thereby increasing the distortion or deformation of the expander ring at the area of contact with the lip portions. It is believed that this distortion results in the resistance forces of the expander ring being concentrated at the area of distortion in opposition to the rotation of the lip portions, thereby further increasing the fatigue failure at such location over the life of the expander ring.

SUMMARY OF THE INVENTION

The present invention provides for a sealing ring comprising a U cup having an expander ring carried by a cavity in the U cup and a pair of lips adjacent the cavity form sealing edges extending sidewards therefrom. The sealing edges are vertically positioned on the outside of the lips at or below the horizontal centerline of the expander ring when the expander ring is mounted in the cavity. This particular orientation of the sealing edges reduces the rotation of the inner top lip portions into the expander ring. The reduction is a result of the smaller bending moment applied to the lip about the base which is related to the lowering of the application of the compressive forces exerted on the sealing edges to the horizontal centerline of the expander ring, or below, when the expander ring is mounted in the cavity.

Such an arrangement is believed to more uniformly distribute the resistance to deformation over the cavity surface.

DETAIL DESCRIPTION

Figure 1:
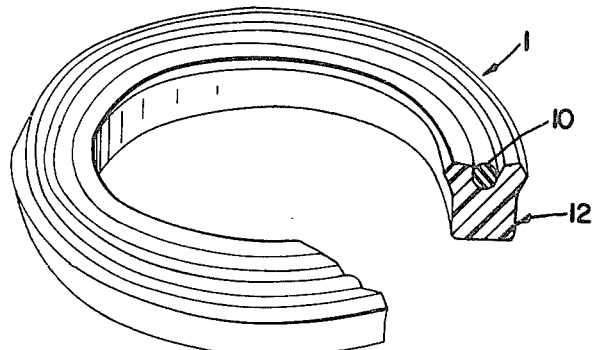
FIG. 1 is a perspective view of a sealing ring embodying the present invention, partly in section.

Referring to the drawings there is shown in FIG. 1 a sealing ring 1 having an expander ring 10 carried by a U cup 12. The U cup 12 and ring 10 can be made of any suitable resilient or elastomeric material, such as polyurethane for the U cup and a synthetic rubber for the expander ring. The expander ring 10 may be an O ring comprising a circular cross section; however, other cross section shapes for the expander ring can be utilized.

Figures 2, 3:
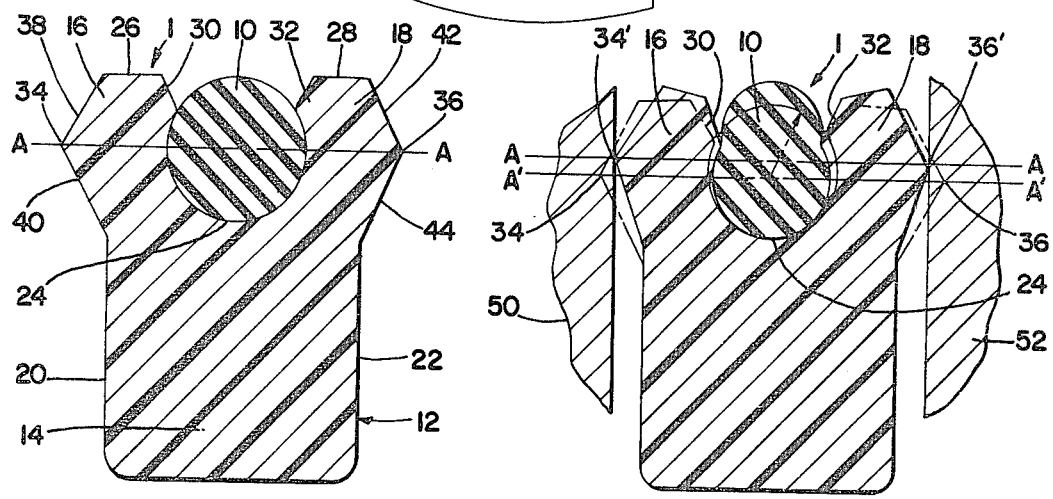
FIG. 2 is an enlarged cross section of the sealing ring of FIG. 1 showing the present invention.
FIG. 3 is an enlarged cross section of the sealing ring of FIG. 1 and FIG. 2 showing the ring in the compressed or installed condition.

The U cup 12, illustrated in FIG. 2, includes a rectilinear base 14 with lips 16 and 18 extending upwardly from the base. The base 14 includes radially inner and outer surfaces, 20 and 22, respectively. A cavity 24 is formed between the lips 12 and 18 to receive or carry the expander ring 10. A substantial portion of the cavity surface conforms to and engages a major portion of the outer surface of the expander ring 10 when the ring 10 fills that portion of the cavity 24.

The lips 16 and 18 include corresponding top surfaces 26 and 28, inner top portions 30 and 32 which partially overlap the expander ring 10 to retain the expander ring within the cavity and sealing edges 34 and 36. The sealing edges are laterally spaced from the radially inner and outer surfaces 20 and 22 on base 14 and are in contact with members 50 and 52 when the sealing ring 1 is installed to seal the clearance between the members. Sealing edge 34 is formed by the intersection of slanted side surfaces 38 and 40 and sealing edge 36 by the intersection of slanted side surfaces 42 and 44.

In the embodiment of the invention shown in FIG. 2, the sealing edges 34 and 36 are at a vertical location such that the edges coincide with the horizontal centerline AA of the expander ring 10 when the ring is bottomed in the cavity to substantially fill the same. This arrangement provides for the initial compression forces, which are directed along centerline AA to be directed toward and applied across the sealing ring at the widest horizontal dimension of the expander ring.

In the compressed or installed condition of the FIG. 2 embodiment, as illustrated in FIG. 3, the lip inner top portions 16 and 18 are slightly rotated toward the resilient expander ring and the lips are contracted towards the cavity to deform the expander ring. In addition the sealing edges 34' and 36' are slightly raised from their initial positions at 34 and 36. This elevation in the position of the sealing edges is accompanied by a similar elevation in the horizontal centerline of the expander ring due to the upward extension or deflection of the expander ring away from the cavity which is caused by the contraction and slight rotation of the lips toward the ring. Therefore, the sealing edges are believed to closely retain their coincidence with the horizontal centerline of the expander ring in the installed condition.

Figure 4:
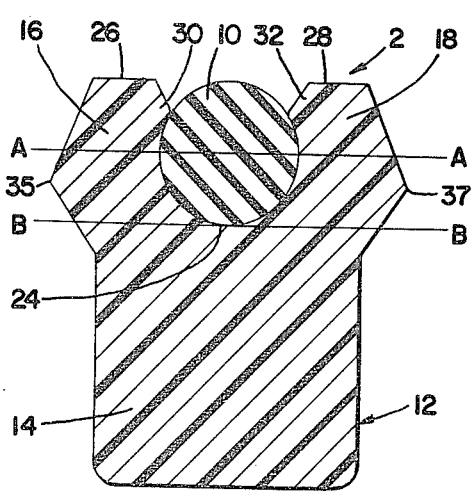
FIG. 4 is an enlarged cross section of a sealing ring showing a modification of the present invention.

A second embodiment shown in FIG. 4, as sealing ring 2, has sealing edges 35 and 37 that are positioned below the horizontal centerline AA of the expander ring when the ring is bottomed in the cavity to substantially fill the same and above the horizontal line BB which intersects the bottom or lowest point of cavity 24. It is believed that as the location of the sealing edges 35 and 37 approaches the horizontal line BB from the horizontal line AA the rotation of the inner top lip portions is reduced while deformation of the resilient U cup lips, 16 and 18, is increased slightly to cause the lips to extend vertically in addition to the horizontal contraction.

Figure 5:
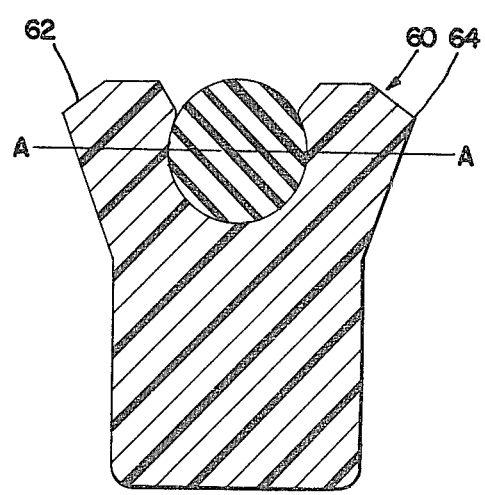
FIG. 5 is an enlarged cross section of a prior art sealing ring.

Because no compression forces are applied to the sealing edges of the present invention above the horizontal centerline of the expander ring in contradistinction to the prior art, as illustrated in FIG. 5 at 62 and 64, the rotation of the inner top lip portions towards the expander ring is reduced as mentioned before. This reduction in rotation when the lips are contracted towards the expander ring in the installed condition is believed to more uniformly load the expander ring thereby prolonging the life of the expander ring.

It is intended that the following claims cover all modifications which fall within the scope of the present invention and are not limited to the specific embodiment illustrated herein.

I claim:

1. A sealing ring for installation between two members spaced apart a predetermined distance, said sealing ring comprising a U cup and an elastomeric expander ring, said U cup having an annular base of generally rectangular cross section and spaced lips extending from one side of the base to form a cavity between the lips into which cavity the expander ring is mounted, each lip having a free end remote from the base, said expander ring when in the cavity having an initial maximum cross section dimension located substantially at the midpoint of the ring in the direction that said lips extend from the base, said expander ring when in the cavity being substantially symmetrical in cross section about a plane through said midpoint and normal to said direction, said lips each having a pair of frusto-conical surfaces that intersect to form well defined circular sealing edges that when the sealing ring is uninstalled are transversely spaced from each other a distance greater than said predetermined distance, said U cup when the sealing ring is uninstalled and the expander ring is bottomed in said cavity having a plane through both said edges that is between said midpoint and the bottom of the cavity whereby when the sealing ring is installed said sealing edges move toward each other by contact with said members to cause said lips to deform said expander ring with no portion of the lips other than the sealing edges being in contact with said members.

2. The sealing ring of claim 1 in which when the sealing ring has been installed between said members the plane through said sealing edges has moved toward the free ends of the lips but has not crossed said midpoint of the expander ring.

3. The sealing ring of claim 1 in which when the sealing ring has been installed between said members both said midpoint of the expander ring and the plane through said sealing edges have moved toward the free ends of the lips but the plane through said sealing edges has not crossed said midpoint.

4. A sealing ring for installation between two members spaced apart a predetermined distance, said sealing ring comprising a U cup and an elastomeric expander ring, said U cup having an annular base of generally rectangular cross section and spaced lips extending from one side of the base to form a cavity between the lips into which cavity the expander ring is mounted, each lip having a free end remote from the base, said expander ring when in the cavity having an initial maximum cross section dimension located substantially at the midpoint of the ring in the direction that said lips extend from the base, said expander ring when in the cavity being substantially symmetrical in cross section about a plane through said midpoint and normal to said direction, said lips each having a pair of surfaces that intersect to form well defined circular sealing edges that when the sealing ring is uninstalled are transversely spaced from each other a distance greater than said predetermined distance, said lip surfaces being straight in cross section, when sectioned by a plane passing therethrough normal to the plane of said sealing edges, said U cup when the sealing ring is uninstalled and the expander ring is bottomed in said cavity having a plane through both said edges that is between said midpoint and the bottom of the cavity whereby when the sealing ring is installed said sealing edges move toward each other by contact with said members to cause said lips to deform said expander ring with no portion of the lips other than the sealing edges being in contact with said members.

* * * * *